United States Patent [19]

Hafner

[11] Patent Number: 4,746,818
[45] Date of Patent: May 24, 1988

[54] CIRCUIT FOR MAINTAINING THE STATE OF AN OUTPUT DESPITE CHANGES IN THE STATE OF INPUT

[75] Inventor: Warren G. Hafner, Lake Carmel, N.Y.

[73] Assignee: Pitney Bowes Inc., Stamford, Conn.

[21] Appl. No.: 710,798

[22] Filed: Mar. 12, 1985

[51] Int. Cl.$^4$ .................. H03K 19/092; H03K 17/16; H03K 19/003

[52] U.S. Cl. .................................. 307/363; 307/473; 307/443; 307/200 B; 307/558; 307/475

[58] Field of Search ............... 307/473, 470, 351, 360, 307/363, 557, 558, 550, 200 B, 443, 475; 365/228

[56] References Cited

U.S. PATENT DOCUMENTS

| | | | |
|---|---|---|---|
| 4,380,709 | 4/1983 | Au | 307/473 |
| 4,399,524 | 8/1983 | Muguruma et al. | 365/229 |
| 4,425,517 | 1/1984 | Smith | 307/473 |
| 4,446,381 | 5/1984 | Dalrymple | 307/200 B |
| 4,498,022 | 2/1985 | Koyama et al. | 307/473 |

Primary Examiner—Stanley D. Miller
Assistant Examiner—Richard Roseen
Attorney, Agent, or Firm—Michael J. DeSha; David E. Pitchenik; Melvin J. Scolnick

[57] ABSTRACT

A low voltage control circuit, and associated method, is provided for maintaining at least one output terminal in a known state regardless of the state of the inputs, when at least one voltage to be monitored is above a threshold voltage and below a predetermined limit voltage, comprising control means for providing a deactivating output voltage when the voltage to be monitored is below the predetermined limit voltage, output means electrically coupled to the control means for receiving the output voltage from the control means and for receiving at least one input voltage, the output means being deactivated in response to the deactivating output voltage to provide a known voltage state at the output terminal until the voltage to be monitored reaches the predetermined limit voltage whereupon the control means will provide an activating output voltage to the output means to enable the voltage state at the output terminal to be controlled by the state of the inputs.

9 Claims, 2 Drawing Sheets

[4,746,818]

CIRCUIT FOR MAINTAINING THE STATE OF AN OUTPUT DESPITE CHANGES IN THE STATE OF INPUT

FIELD OF THE INVENTION

The present invention relates to low voltage control circuits, and more particularly to a low voltage control circuit for maintaining at least one output in a known state of the state of the inputs when at least one voltage to be monitored is above a threshold voltage and below a predetermined limit voltage.

BACKGROUND OF THE INVENTION

In various electronic systems it is desirable to provide stable, known output voltage states during transition period when one or more voltages to be monitored have not yet reached a stable operating voltage. For example, in electronic postage meter systems of the type disclosed in U.S. Pat. No. 3,978,457 for Microcomputerized Electronic Postage Meter Systems, U.S. Pat. No. 3,938,095 for Computer Responsive Postage Meter, European Patent Application No. 80400603.9, filed May 5, 1980, for Electronic Postage Meter Having Improved Security and Fault Tolerance Features, U.S. Pat. No. 4,301,507 for Electronic Postage Meter Having Plural Computing Systems, and copending application Ser. No. 447,815, filed Dec. 8, 1982, for Stand-Alone Electronic Mailing Machine, one or more microprocessors are employed with some form of non-volatile memory (NVM) capability to store critical postage accounting information. This information includes, for example, the amount of postage remaining in the meter for subsequent printing and the total amount of postage already printed by the meter. Other types of accounting or operating data may also be stored in the non-volatile memory, as desired.

However, during the power-up and power-down cycles of an electronic postage meter, the microprocessor and other devices in the meter may be non-operational, unstable or function erratically until the voltages to be monitored, e.g., chip supply voltages, reach stable levels. Such erratic operation may result in the erasure of data or the writing of spurious data in NVM prior to reaching a known operational voltage during power-up and subsequent to falling below the known operational voltage during power-down of the meter.

SUMMARY OF THE INVENTION

It is an object of the present invention to provide a low voltage control circuit for maintaining at least one output in a known state regardless of the state of the inputs when a voltage to be monitored is below a predetermined limit voltage and above a threshold voltage.

It is a further object of the present invention to provide a low voltage control circuit for maintaining digital outputs in a known state regardless of the input states.

It is a still further object of the present invention to provide a low voltage control circuit which provides two levels of voltage control.

It is a still further object of the present invention to provide a reliable low voltage control circuit.

It is a further object of the present invention to provide a low voltage control circuit for maintaining at least one output in a known state during the power-up and power-down cycles of an electronic postage meter.

Briefly, in accordance with the present invention a low voltage control circuit and associated method is provided for maintaining at least one output terminal in a known state regardless of the input state of the inputs when at least one voltage to be monitored is above a threshold voltage and below a predetermined limit voltage, comprising control means for providing a deactivating output voltage when the voltage to be monitored is below the predetermined limit voltage, output means electrically coupled to the control means for receiving the output voltage from the control means and for receiving at least one input voltage, the output means being deactivated in response to the deactivating output voltage to provide a known voltage state at the output terminal until the voltage to be monitored reaches the predetermined limit voltage whereupon the control means will provide an activate output voltage to the output means to enable the voltage state at the output terminal to be controlled by the state of the inputs.

Other objects, aspects and advantages of the present invention should be understood from the detailed description considered in conjunction with the drawings, as follows:

DETAILED DESCRIPTION

Figure 1:
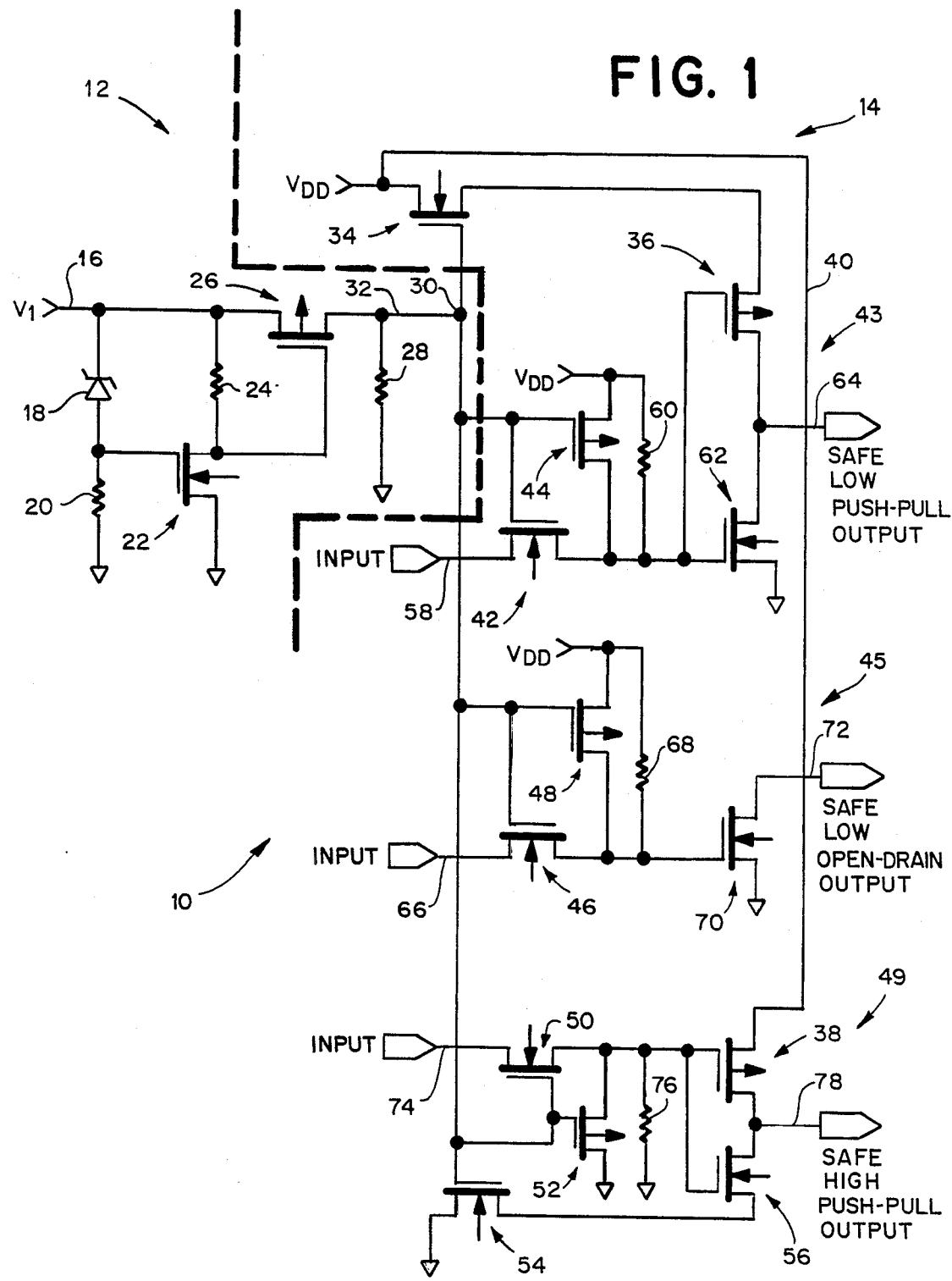
FIG. 1 is a schematic circuit diagram of a low voltage control circuit in accordance with the present invention for receiving one voltage to be monitored ($V_1$) and having one or more input voltages.

Referring to FIG. 1, a low voltage control circuit in accordance with the present invention is indicated generally at 10. The low voltage control circuit 10 includes a control section indicated generally at 12, to the left of the dotted line in FIG. 1, and an output section indicated generally at 14 to the right of the dotted line in FIG. 1. Typically in this embodiment the ground point is synonymous with the negative output supply voltage $V_{SS}$.

The control section 12 includes a supply line 16 for receiving a voltage to be monitored $V_1$, which may be a regulated or unregulated chip supply voltage. The supply line 16 is coupled to the cathode of a Zener diode 18. The anode of the Zener diode 18 is coupled to ground through biasing resistor 20. Additionally, the anode of the Zener diode 18 is coupled to the gate terminal of a field effect transistor in the form of an N-channel MOSFET 22. The source terminal of the MOSFET 22 is grounded and the drain terminal is coupled to the input line through biasing resistor 24. The drain terminal of the MOSFET 22 is also coupled to the gate terminal of a field effect transistor in the form of a P-channel MOSFET 26. The source terminal of the MOSFET 26 is coupled to the positive output supply voltage and resistor 24. The drain terminal of the MOSFET 26 is coupled to a grounded biasing resistor 28 and to output point 30 over line 32.

The output point 30 is coupled to the gate terminal of a field effect transistor in the form of an N-channel MOSFET 34 which has its source terminal coupled to the positive output supply voltage $V_{DD}$. The drain terminal of the MOSFET 34 is coupled to the source terminal of a field effect transistor in the form of a P-channel MOSFET 36, which is part of the output section 14. Additionally, the supply voltage $V_{DD}$ is supplied directly to the source terminal of a field effect transistor in the form of a P-channel MOSFET 38 over line 40.

The output point 30 is also coupled to the gate terminal of a first field effect transistor in the form of an N-channel MOSFET 42 and the gate terminal of a second field effect transistor in the form of a P-channel MOSFET 44, both of which form part of a first output portion of the output section 14, as indicated generally by the number 43. The output point 30 is similarly coupled to any subsequent output portions of the output section 14. As illustrated in FIG. 1, there are two subsequent output portions, the first of which is designated 45 and includes a first field effect transistor in the form of an N-channel MOSFET 46 and a second field effect transistor in the form of a P-channel MOSFET 48, each having their gate terminals coupled to the output point 30. The second subsequent output portion designated 49 also includes a first field effect transistor in the form of an N-channel MOSFET 50 and a second field effect transistor in the form of a P-channel MOSFET 52 each having their gate terminals coupled to the output point 30. Finally, the output point 30 is also coupled to the gate terminal of a field effect transistor in the form of an N-channel MOSFET 54. The source terminal of the MOSFET 54 is ground or the negative output supply voltage, $V_{SS}$; and the drain terminal is coupled to the source terminal of a field effect transistor in the form of an N-channel MOSFET 56 in the third output portion 49.

Referring again to the first output portion 43 of the output section 14, the source terminal of the MOSFET 42 is coupled to a first input line 58 to receive an Input and the drain terminal is coupled to the drain terminal of MOSFET 44. The source terminal of the MOSFET 44 is coupled to the output positive supply voltage $V_{DD}$ and to one end of a biasing resistor 60. The other end of the resistor 60 is coupled to the drain terminals of MOSFETs 42 and 44 and to the gate terminal of MOSFET 36 and the gate terminal of a field effect transistor in the form of an N-channel MOSFET 62 arranged in a push-pull configuration. The drain terminals of MOSFETs 36 and 62 are coupled together and the source terminal of MOSFET 62 grounded. A first output is obtained from an output line 64 which is coupled to the drain terminals of the MOSFETs 36 and 62.

Referring again to the second output portion 45 of the output section 14, the source terminal of the MOSFET 46 is coupled to a second input line 66 to receive an Input and its drain terminal is coupled to the drain terminal of MOSFET 48. The source terminal of the MOSFET 48 is coupled to the output positive supply voltage, $V_{DD}$, and to one end of a biasing resistor 68. The other end of the resistor 68 is coupled to the drain terminals of MOSFETs 46 and 48 and to the gate terminal of a field effect transistor in the form of an N-channel MOSFET 70 whose source terminal is grounded and whose drain terminal is coupled to an output line 72. The second output is obtained from output line 72.

Referring again to the third output portion 49 of the output section 14, the source terminal of the MOSFET 50 is coupled to a third input line 74 to receive an Input and the drain terminal to the drain terminal of MOSFET 52. The source terminal of the MOSFET 52 is grounded. A biasing resistor 76 couples the drain terminals of MOSFETs 50 and 52 to ground. Additionally, the drain terminals of the MOSFETs 50 and 52 are coupled to the gate terminals of MOSFET 38 and MOSFET 56 arranged in a push-pull configuration. The drain terminals of MOSFETs 38 and 56 are coupled together and the source terminal of MOSFET 56 is coupled to the drain terminal of MOSFET 54. The third output is obtained from an output line 78 coupled to the drain terminals of the MOSFETs 38 and 56.

Figure 2:
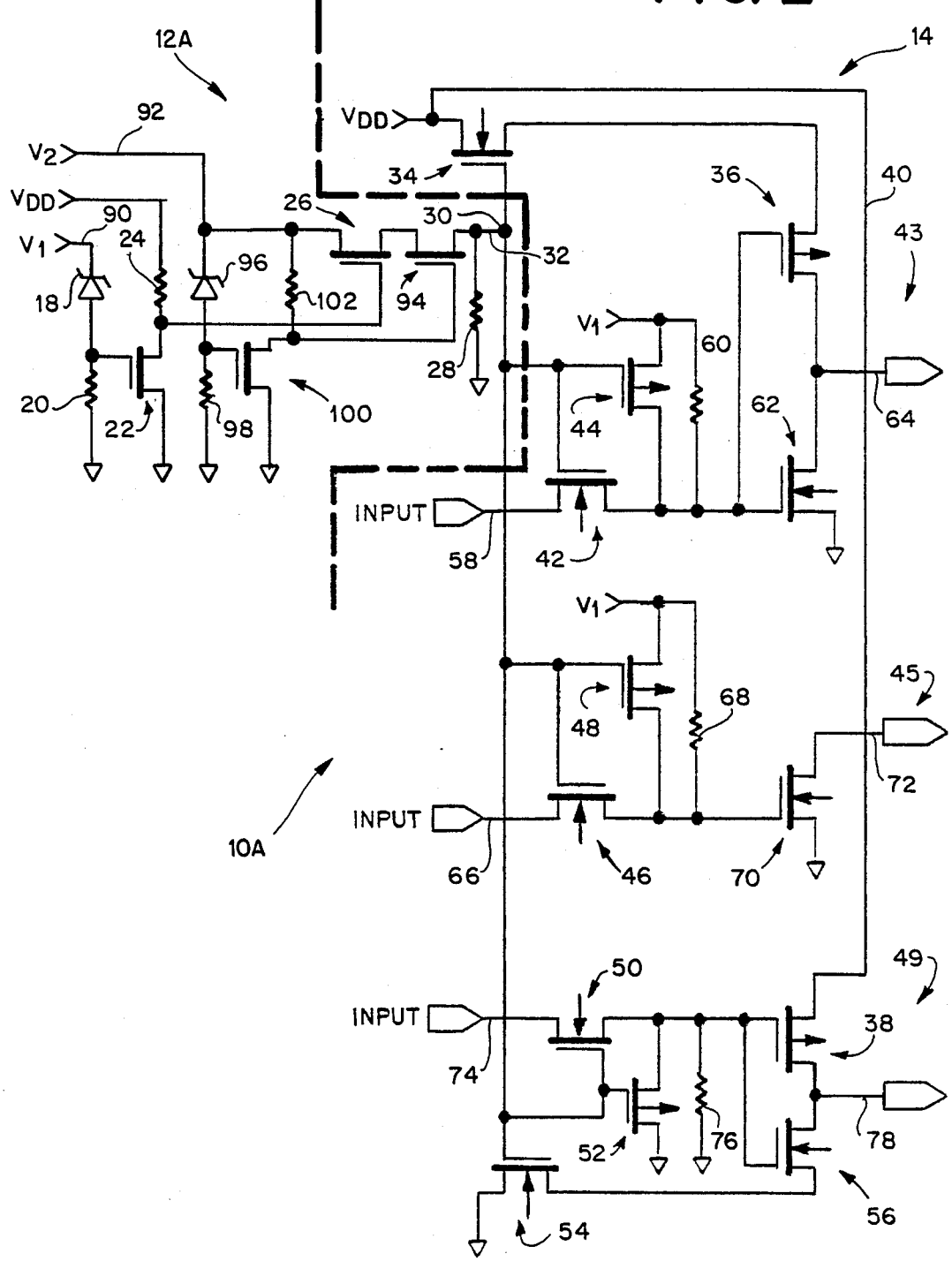
FIG. 2 is a schematic circut diagram of a low voltage control circuit in accordance with the present invention for receiving a plurality of input voltages to be monitored ($V_1$ and $V_2$) and having one or more input voltages.

Referring to FIG. 2, an alternative embodiment of a low voltage control circuit in accordance with the present invention which is illustrated as monitoring more than one voltage, here $V_1$ and $V_2$, is indicated generally at 10A. In discussing FIG. 2, the same components which appear in FIG. 1 are given like numbers. Moreover, since the output section 14 includes the same components electrically connected in the same manner as previously described with reference to FIG. 1, there is no need to repeat a description of the output section 14 of FIG. 2.

However, the control section 12A of FIG. 2 has been modified from that shown in FIG. 1 to monitor a plurality of voltages, here $V_1$ and $V_2$, although it should be understood that additional voltages may be monitored by further modifying the control section 12 of FIG. 1 in the same manner that it was modified to provide the control section 12A of FIG. 2. The supply voltage $V_1$ is applied to line 90 which is coupled to the cathode of Zener diode 18. The anode of the Zener diode 18 is coupled to ground through a biasing resistor 20. Additionally, the anode of the Zerer diode 18 is coupled to the gate terminal of a field effect transistor in the form of an N-channel MOSFET 22. The source terminal of the MOSFET 22 is grounded and the drain terminal is coupled to the positive output supply voltage $V_{DD}$ through biasing resistor 24. The input line 92 receives the second supply voltage $V_2$. The drain terminal of the MOSFET 22 is also coupled to the gate terminal of a field effect transistor in the form of a P-channel MOSFET 26. The source terminal of the MOSFET 26 is coupled to the second supply voltage $V_2$ and the drain terminal is coupled to the source terminal of a field effect transistor in the form of a P-channel MOSFET 94. The drain terminal of the MOSFET 94 is coupled to the output point 30 through line 32 and to a grounded biasing resistor 28.

A second Zener diode 96 has its cathode coupled to the line 92 and its anode coupled to grounded biasing resistor 98. Additionally, the anode of the Zener diode 96 is coupled to the gate of a field effect transistor in the form of an N-channel MOSFET 100 whose source terminal is grounded and whose drain terminal is coupled to the second supply voltage $V_2$ through biasing resistor 102 and to the gate terminal of the MOSFET 94.

In operating the low voltage control circuit 10 of FIG. 1, the voltage of the Zener diode 18 provides the setpoint for the maximum or limiting value of the voltage $V_1$ which corresponds to a stable operating voltage, such as a chip supply voltage, e.g. approximately 5 V. As the voltage $V_1$ increases toward the stable operating voltage, the Zener diode 18 does not conduct until its breakdown voltage is reached. Thus, no voltage is applied to the gate terminal of the MOSFET 22 and its source terminal is grounded so that MOSFET 22 is OFF. This causes the gate terminal of the MOSFET 26 to be pulled high through biasing resistor 24, turning the MOSFET 26 off. Thus, the output at the output point 30 is low, being pulled toward ground by the biasing resistor 28.

The low output voltage present at the output point 30 pulls the gate terminal of the MOSFET 34 low, turning MOSFET 34 off. Thus, the positive output supply voltage is applied directly to the source terminal of the MOSFET 38 in the third output portion 49. The low output voltage present at the output point 30 is also applied to the gate terminals of the MOSFETs 42 and 44 causing the MOSFET 44 to turn ON and causing the MOSFET 42 to turn off. Thus, MOSFET 42 effectively provides an open circuit to the first input line 58 preventing the transmission of the Input voltage on line 58 to the output line 64. The positive voltage $V_1$ present at the drain terminal of the MOSFET 44 as a result of its conduction is applied to the gate terminals of the MOSFETs 36 and 62, causing MOSFET 36 to turn off and MOSFET 62 to turn on when $V_1$ is above the threshold voltage of MOSFET 62. With MOSFET 62 conducting, its drain terminal and therefore the output line 64 are pulled toward ground providing a SAFE LOW PUSH-PULL OUTPUT on line 64 regardless of the magnitude or state of the input voltage present on input line 58. Additionally, MOSFET 34 being off prevents the possibility of the positive output supply voltage from reaching the output 64.

Similarly, the presence of the low voltage at output point 30 causes the MOSFET 48 to turn on and MOSFET 46 to turn off. Thus, MOSFET 46 effectively provides an open circuit to the second input line 66 preventing the transmission of the Input voltage on line 66 to the output line 72. The positive voltage present at the drain terminal of the MOSFET 48 is applied to the gate terminal of the MOSFET 70, turning it on. With the MOSFET 70 on, its drain terminal and therefore output line 72, are pulled toward ground providing a second SAFE LOW OPEN-DRAIN OUTPUT on output line of the magnitude or state of the input voltage present on line 66.

Further, the presence of the low voltage at output point 30 also causes the MOSFET 52 to turn on, pulling the drain terminal of the MOSFET 52 toward ground, and MOSFET 50 to turn off preventing the transmission of the Input voltage on input line 74 to the output line 78. With its gate terminal pulled low MOSFET 38 turns on, applying the positive output supply voltage $V_{DD}$ (high) to the output line 78. Thus, a SAFE HIGH PUSH-PULL OUTPUT is provided on output line 78. The low voltage present at the gate terminals of MOSFET 56 and MOSFET 54 turns them off, providing a double level of protection for isolating ground, or $V_{SS}$, from output 78.

When $V_1$ increases to the breakdown voltage of the Zener diode 18, the Zener diode conducts and the current flow through resistor 20 supplies a positive voltage to the gate terminal of the MOSFET 22, causing it to turn on. With MOSFET 22 on, the gate terminal of the MOSFET 26 is pulled toward ground causing MOSFET 26 to turn on. With MOSFET 26 ON, the output at the output point 30 is high.

A high output present at output point 30 turns MOSFET 34 on to provide a high output at the source terminal of the MOSFET 36. Further, the high output present at the output point 30 turns MOSFET 42 on and MOSFET 44 off. Thus, the Input present on input line 58 is applied to the gate terminals of the MOSFETs 36 and 62. If the Input on input line 58 is low, the gate terminal of MOSFET 62 is biased low, turning it off. However, the presence of a low voltage at the gate terminal of the MOSFET 36 causes it to turn on, transmitting a high output in the form of $V_{DD}$ to the output line 64. In contrast, if the Input on input line 58 is high, the gate terminal of the MOSFET 36 is biased high, turning it off. However, the presence of a high output at the gate terminal of the MOSFET 62 causes it to turn on, pulling the output line 64 toward ground to provide a low output on output line 64. Thus, the first output portion 43 of the output section 14 functions as an inverter.

With regard to the second output portion 45, when a high output is present at the output point 30, the MOSFET 46 is turned on and MOSFET 48 is turned off. Thus, the Input present on input line 66 is applied to the gate terminal of the MOSFET 70. If the Input on input line 66 is low, the gate terminal of MOSFET 70 is biased low and the MOSFET 70 is off, providing a high impedance output. If the Input on input line 66 is high, the gate terminal of the MOSFET 70 is biased high, causing MOSFET 70 to turn on and pulling it drain terminal and output line 72 toward ground to provide a low output on output line 72. Thus, the second output portion 45 of the output section 14 functions as an inverter with an open drain output.

With respect to the third output section 49 the high output at point 30, turns on MOSFET 54, enabling the low output supply voltage to reach the output buffer MOSFET 56. A high output present at the output point 30 also turns MOSFET 50 on and turns MOSFET 52 off. If the Input on input line 74 is low, the gate terminal of the MOSFET 38 is biased low turning the MOSFET 38 on and the gate terminal of the MOSFET 56 is biased low turning the MOSFET 56 off. Thus, the output line 78 receives a high voltage in the form of $V_1$ from MOSFET 38. In contrast, if the Input on input line 74 is high, the gate terminal of the MOSFET 38 is biased high, turning the MOSFET 38 off. The presence of the high output at the gate terminal of the MOSFET 56 causes it to turn on, pulling the output line 78 toward ground to provide a low output on output line 78. Thus, the third output portion 49 of the output section 14 also functions as an inverter.

The operation of the output section 14 of the low voltage control circuit 10A illustrated in FIG. 2 is the same as that described in FIG. 1; therefore, only the operation of the input section 12A of FIG. 2 will be described. With respect to the input section 12A, as $V_1$ and $V_2$ increase, while remaining below the set points or breakdown voltages of the Zener diodes 18 and 96, respectively, the MOSFETs 22 and 100 remain off, allowing the gate terminals of MOSFETs 26 and 94 to be pulled high through biasing resistors 24 and 102, respectively, turning MOSFETs 26 and 94 off. Thus, output point 30 is pulled low toward ground by the biasing resistor 28. When $V_1$ and $V_2$ increase to the predetermined limit voltages, i.e., the set points of the Zener diodes 18 and 96, the output at the output point 30 will be high. Thus, a high output in the form of $V_{DD}$ appears at the output point 30. Until both $V_1$ and $V_2$ reach the set points of the Zener diodes 18 and 96, the output point 30 will remain low since both MOSFETs 26 and 94 are not conducting. Thus, output point 30 is pulled low through the current limiting resistor 28.

It should be understood that additional supply voltages may be added to the control section, and additional inputs and outputs added to the output section as desired. Also, $V_1$ or $V_2$ may be one in the same as $V_{DD}$.

Moreover, the integrated circuit components of the low voltage control circuit described herein may be replaced by discrete components to provide a discrete low voltage control system. Additionally, the voltage limiting devices, i.e., the Zener diodes, may be replaced by integrated circuit components, e.g., a plurality of series connected MOSFETs. It should be understood by those skilled in the art that various other modifications may be made in the present invention without departing from the spirit and scope thereof, as described in the specification and defined in the appended claims.

What is claimed is:

1. A low voltage control circuit having at least one input terminal and at least one output terminal, said circuit being operative for maintaining said at least one output terminal in known state regardless of the state of an input at the input terminal when at least one voltage to be monitored is below a predetermined limit voltage, comprising:

control means for providing a deactivating output voltage when the voltage to be monitored is below the predetermined limit voltage;

output means electrically coupled to said control means for receiving the deactivating output voltage from said control means and for receiving at least one input voltage from said input terminal;

said output means being deactivated in response to the deactivating output voltage to provide a known voltage level at the output terminal until the voltage to be monitored reaches the predetermined limit voltage whereupon said control means will provide an activating output voltage to said output means to enable the voltage level at the output terminal to be controlled by the voltage level of the input;

said control means including a voltage limit means connected to receive the voltage to be monitored for establishing the predetermined limit voltage; and;

said voltage limit means including a Zener diode coupled in series with a biasing resistor, said Zener diode being connected to receive the voltage to be monitored and the resistor being grounded, the junction of the Zener diode and the biasing resistor providing the limiting voltage.

2. The low voltage control circuit recited in claim 1, wherein:

said control means includes at least one field effect transistor means coupled between said voltage limit means and said output means for providing the deactivating output voltage.

3. The low voltage control circuit recited in claim 1, wherein:

said control means includes a first field effect transistor means and a second field effect transistor means, each field effect transistor means having a gate, a source, and a drain, the gate of said first field effect transistor means being electrically connected to the drain of said second field effect transistor means to provide the deactivating output voltage whenever the voltage at the gate of the second field effect transistor is less than the predetermined limit voltage.

4. The low voltage control circuit recited in claim 2, wherein:

said control means includes a plurality of voltage limit means, each of said voltage limit means being electrically coupled to field effect transistor means for providing the deactivating output voltage when the voltages to be monitored are below the predetermined limit voltages established by said voltage limit means.

5. A low voltage control circuit for maintaining at least one output terminal in a known state regardless of the state of any inputs when at least one voltage to be monitored is above a threshold voltage and below a predetermined limit voltage, comprising:

control means for providing a deactivating output voltage when the voltage to be monitored is below the predetermined limit voltage;

output means electrically coupled to said control means for receiving the deactivating output voltage from said control means and for receiving at least one input voltage;

said output means being deactivated in response to the deactivating output voltage to provide a known voltage level at the output terminal until the voltage to be monitored reaches the predetermined limit voltage whereupon said control means will provide an activating output voltage to said output means to enable the voltage state at the output terminal to be controlled by the state of the inputs;

said control means includes a plurality of voltage limit means for establishing the predetermined limit voltages each of said voltage limit means being elecltrically coupled to control field effect transistor means for providing the deactivating output voltage;

each said voltage limit means includng a Zener diode coupled in series with a biasing resistor, said Zener diode being connected to receive the voltage to be monitored and the resistor being grounded, the junction of the Zener diode and the biasing resistor providing the limiting voltage; and said output means includes output field effect transistor means connected to receive an input signal and providing an output signal in response thereto at the output terminal and switch means for inhibiting transmission of an input signal to said output field effect transistor means in the presence of the deactivating output signal from said control means.

6. The low voltage control circuit recited in claim 5, wherein:

said control field effect transistor means includes a first field effect transistor and a second field effect transistor being electrically connected to each other and to said voltage limit means;

said output field effect transistor means includes a pair of field effect transistors electrically connected in a push-pull arrangement coupled to receive one of said input signals and providing an output signal in response thereto.

7. The low voltage control circuit recited in claim 6, where in;

said output means includes a second pair of field effect transistors electrically connected in a second push-pull arrangement coupled to receive another of said input signals and providing an output in response thereto and a second switch means for inhibiting transmission of a second input signal to said second pair of field effect transistors in the presence of the deactivating output signal from said control means.

8. The low voltage control circuit recited in claim 7, where in:

said output means includes third field effect transistor means coupled to receive a third input signal and for providing an output signal in response and a third switch means for inhibiting transmission of an input signal to said third field effect transistor means in the presence of the deactivating output signal from said control means.

9. A low voltage control circuit having at least one input terminal and at least one output terminal, said circuit being operative for maintaining said at least one output terminal in a known state regardless of the state of an input at the input terminal when at least one voltage to be monitored is below a predetermined limit voltage, comprising:

control means for providing a deactivating output voltage when the voltage to be monitored is below the predetermined limit voltage;

output means electrically coupled to said control means for receiving the deactivating output voltage from said control means and for receiving at least one input voltage from said input terminal;

said output means being deactivated in response to the deactivating output voltage to provide a known voltage level at the output terminal until the voltage to be monitored reaches the predetermined limit voltage whereupon said control means will provide an activating output voltage to said output means to enable the voltage level at the output terminal to be controlled by the voltage level of the input;

said control means including a plurality of voltage limit means, each of said voltage limit means being electrically coupled to field effect transistor means for providing the deactivating output voltage when the voltages to be monitored are below the predetermined limit voltages established by said voltage limit means; and each said voltage limit means including a Zener diode coupled in series with a biasing resistor, said Zener diode being connected to receive the voltage to be monitored and the resistor being grounded, the junction of the Zener diode and the biasing resistor providing the limiting voltage.

* * * * *